No. 884,220. PATENTED APR. 7, 1908.
E. P. SEDGWICK.
PIANO PEDAL.
APPLICATION FILED JUNE 27, 1907.

Attest:
John Enders.
Henry Mor.

Inventor:
Earl P. Sedgwick,
by Robert Burns
Attorney

UNITED STATES PATENT OFFICE.

EARL P. SEDGWICK, OF HIGHLAND PARK, ILLINOIS, ASSIGNOR TO CHICAGO HARDWARE FOUNDRY COMPANY, OF NORTH CHICAGO, ILLINOIS, A CORPORATION OF ILLINOIS.

PIANO-PEDAL.

No. 884,220.   Specification of Letters Patent.   Patented April 7, 1908.

Application filed June 27, 1907. Serial No. 381,006.

*To all whom it may concern:*

Be it known that I, EARL P. SEDGWICK, a citizen of the United States of America, and a resident of Highland Park, in the county of Lake and State of Illinois, have invented certain new and useful Improvements in Piano-Pedals, of which the following is a specification.

This invention relates to the pedals of pianos, and has for its object to provide a simple and efficient formation and combination of parts, whereby an ornamental finish is imparted to the front or visible portion of the pedal in a lasting and economical manner, all as will hereinafter more fully appear.

Figure 1:
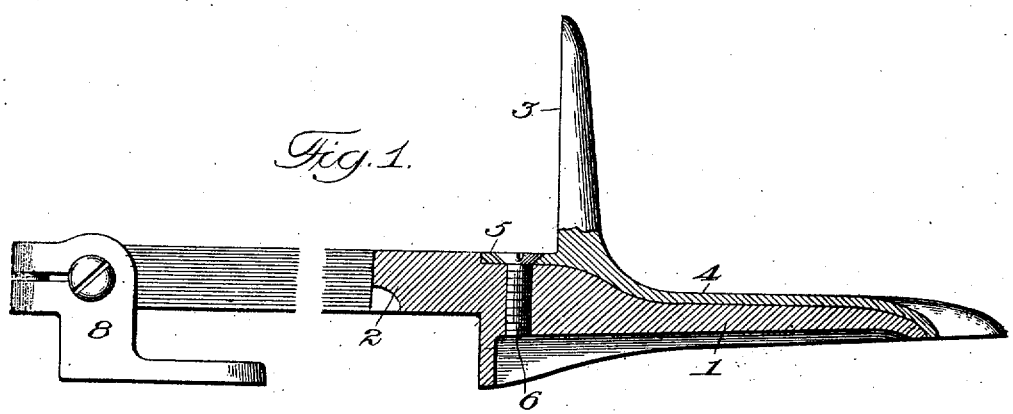
Figure 2:
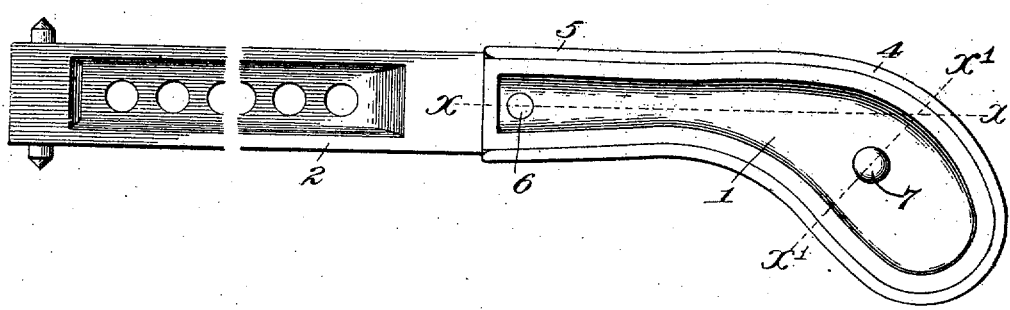
Figure 3:

In the accompanying drawings: Figure 1, is a side elevation partly in section on line $x$—$x$ Fig. 2, of a piano pedal embodying the present invention. Fig. 2, is a bottom view of the same. Fig. 3, is a detail cross section on line $x'$—$x'$ Fig. 2.

Similar numerals of reference indicate like parts in the several views.

Referring to the drawings, 1 represents the outer or tread portion, and 2 the inner or shank portion of a piano pedal, which pedal intermediate its length is provided with the usual vertical horn 3 which closes the opening of the piano casing in which the pedal has movement.

In the present improvement the inner portion 2 and the outer portion 1 of the pedal are formed integrally of cast iron, the outer or tread portion being reduced in size and having a convex upper surface as shown; said reduction in the size of the outer pedal portion corresponding with the thickness of the finish member now to be described.

4 is the finish member above referred to and which is cast of brass or other ornamental metal, and nickel plated or otherwise. The forward portion of such member is of a substantially concave-convex form in cross section, so as to closely fit the convex surface of the outer or tread portion 1 of the pedal to conceal the same from view; while near its rear end said finish member is formed with the vertical horn 3 aforesaid, and with a tongue 5 to the rear of said horn for the passage of a screw 6, by which the finish member is attached in place at its rear end.

7 is a rivet stud, preferably formed integrally on the finish member near its outer end; such stud passes through a corresponding hole in the outer portion 1 of the piano pedal, with its end upset or riveted against the under surface of the portion 1, aforesaid.

8 is the usual supporting bracket or standard to which the pedal is pivotally attached.

Having thus fully described my said invention, what I claim as new and desire to secure by Letters Patent, is:

A piano pedal having its tread and shank portions integrally formed, the tread portion being reduced in size and having a convex upper surface, a finishing member comprising a body portion having a concave-convex form adapted to fit the tread portion of the pedal, a vertical horn, and an attaching tongue to the rear of said horn, means for attaching said tongue to the tread portion of the pedal, and a rivet stud on the finish member engaging a hole in the tread portion of the pedal, substantially as set forth.

Signed at North Chicago, Ill., this 19th day of June, 1907.

EARL P. SEDGWICK.

Witnesses:
J. M. ELLIS,
G. L. BREWSTER.